C. W. PATTON.
Track-Clearers for Locomotives.

No. 154,615.

Patented Sept. 1, 1874.

WITNESSES
Robert Everitt,
George E. Upham.

INVENTOR
C. W. Patton,
BY Chipman Hosmer & Co
ATTORNEYS

UNITED STATES PATENT OFFICE.

CHARLES WASHINGTON PATTON, OF WACO, TENNESSEE, ASSIGNOR OF ONE-THIRD HIS RIGHT TO JOHN D. JOHNSON, OF SAME PLACE.

IMPROVEMENT IN TRACK-CLEARERS FOR LOCOMOTIVES.

Specification forming part of Letters Patent No. 154,615, dated September 1, 1874; application filed June 6, 1874.

*To all whom it may concern:*

Be it known that I, CHARLES W. PATTON, of Waco, in the county of Maury and State of Tennessee, have invented a new and valuable Improvement in Locomotive Attachments; and I do hereby declare that the following is a full, clear, and exact description of the construction and operation of the same, reference being had to the annexed drawings making a part of this specification, and to the letters and figures of reference marked thereon.

Figure 1:
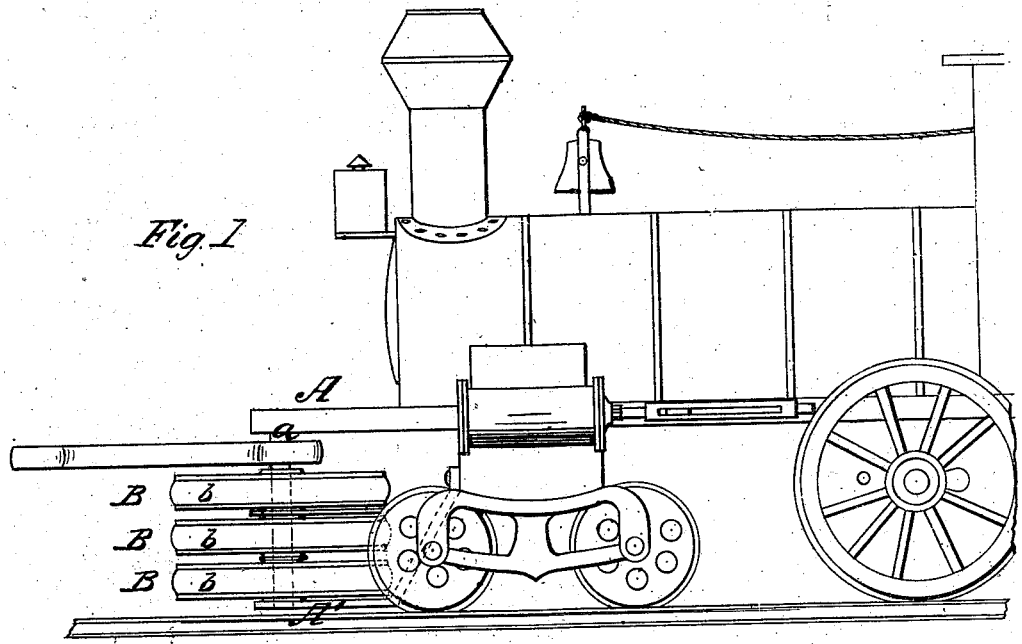
Figure 2:
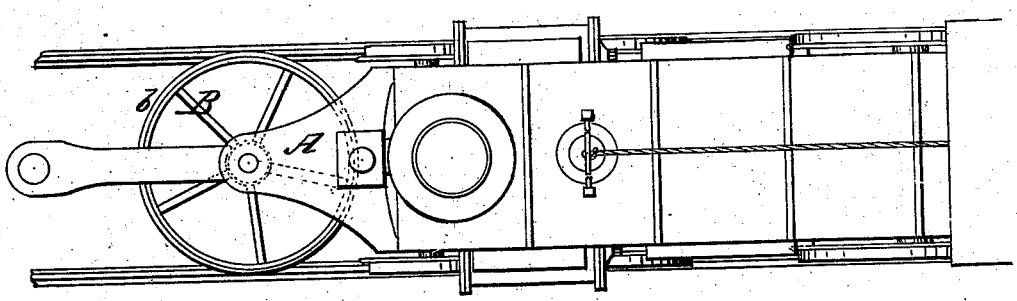

Figure 1 of the drawing is a representation of a side view of my device, and Fig. 2 is a plan view.

This invention has relation to locomotive-pilots; and it consists in the employment of rotating circular fenders having cushioned peripheries, and arranged one above another in horizontal planes, whereby obstructions will be thrown from the track without injury, and with comparatively little shock to the train, as will be hereinafter explained.

In the annexed drawings, A designates the frame of a locomotive, and A' a strong bracket, which is rigidly secured to said frame in a suitable manner. B B designate horizontal wheels, which constitute the improved rotary fender or pilot. These wheels are applied to rotate freely around a vertical shaft or post, $a$, which is rigidly secured to the front end of the frame A and to the bracket A'. The periphery of each wheel B is constructed with a cushion, $b$, of india-rubber or other suitable material, the object of which is to modify the shock when an animal or other object is struck. These wheels B are preferably of a greater diameter than the width of the track, so that when they strike an object they will throw it clear of the track. They may be of the same diameter, or the lowest wheel may be the largest, and the others successively diminish in diameter, so as to form a conical pilot, each wheel composing which being free to rotate independently of its fellows.

What I claim as new, and desire to secure by Letters Patent, is—

A locomotive-pilot composed essentially of horizontal revolving wheels, having their peripheries cushioned, substantially as described.

In testimony that I claim the above I have hereunto subscribed my name in the presence of two witnesses.

CHARLES WASHINGTON PATTON.

Witnesses:
L. H. ATTWELL,
J. T. L. COCHRAN.